United States Patent [19]

Frankila

[11] Patent Number: 4,976,493
[45] Date of Patent: Dec. 11, 1990

[54] VEHICLE HEADREST POST GUIDE

[76] Inventor: John W. Frankila, 5140 Sunset, Jackson, Mich. 49203

[21] Appl. No.: 385,514

[22] Filed: Feb. 27, 1989

[51] Int. Cl.$^5$ .............................................. A47C 7/36
[52] U.S. Cl. ..................................... 297/410; 248/408
[58] Field of Search ............... 248/53 G, 221.3, 221.4, 248/407, 408; 403/104, 106, 109, 379, 37 B; 297/410

[56] References Cited

U.S. PATENT DOCUMENTS

| | | | |
|---|---|---|---|
| 3,542,429 | 11/1970 | Inoue | 297/410 |
| 3,567,282 | 3/1971 | Ohta | 297/410 |
| 4,489,979 | 12/1984 | Zyngier | 297/410 |
| 4,519,650 | 5/1985 | Terada . | |
| 4,527,834 | 7/1985 | Zyngier | 297/410 |
| 4,577,904 | 3/1986 | Wiese et al. | 297/410 |
| 4,679,850 | 7/1987 | Bianchi et al. | 297/410 |
| 4,854,642 | 8/1989 | Vidwans | 297/410 |

FOREIGN PATENT DOCUMENTS 2024615  1/1980  United Kingdom ................ 297/410

Primary Examiner—Ramon O. Ramirez
Assistant Examiner—Robert A. Olson
Attorney, Agent, or Firm—David A. Greenlee

[57] ABSTRACT

A plastic guide is provided for mounting a headrest to a vehicle seat back. The guide is an elongated plastic member having a through bore, locking tangs on one end, intermediate shoulders, which terminate in spaced fingers, a trim flange on the other end, and a spring finger entering the bore. The guide is inserted through a hole in the upholstery of a trimmed seat back and through aligned apertures in a seat frame tube so that the locking tangs cooperate with the shoulders to lock the guide to the tube and the fingers snap over the tube to prevent relative rotation. The spring finger engages detent notches in the headrest support post to position the headrest relative to the seat back. An axial slot in the guide permits insertion of an elongated tool to pry the spring finger out of a locking notch to enable removal of the post to separate the headrest from the seat back.

8 Claims, 2 Drawing Sheets

VEHICLE HEADREST POST GUIDE

TECHNICAL FIELD

This invention relates to guides for headrest support posts mounted in a vehicle seat back.

BACKGROUND OF THE INVENTION

Vehicle headrests are conventionally mounted on one or two support posts that are inserted into guide sleeves, tubes or brackets affixed to the seat back frame structure. Generally, some sort of adjustment mechanism is provided to enable variable vertical positioning of the headrest and to prevent inadvertent removal of the headrest from the seatback.

Modern vehicle seat frame structures are made of metal tubing. Headrest guide sleeves are conventionally mounted on a bracket on the seat back frame tubing. Such a guide is shown in U.S. Pat. No. 4,577,904 to Wiese et al. which includes a plastic sleeve that is bayonet mounted to a bracket, a formed flat metal spring for detenting in headrest support post notches, and a release button.

Another arrangement utilizes holes drilled through the tubing to provide metal collars which cooperate with a two-piece plastic guide to provide the headrest support post guide. One guide piece is installed before the seat back is trimmed with upholstery and a cooperating plastic guide socket is installed after seat trimming to finish off the hole in the upholstery. This arrangement is disclosed in U.S. Pat. No. 4,679,850 to Bianchi et al.

Both of the above described arrangements require either a special bracket on the seat back frame structure or a multi-part guide that is installed in two steps.

SUMMARY OF THE INVENTION

It is an object of this invention to provide a simplified headrest support post guide that requires no special brackets and may be installed in one step through a hole in the upholstery after the seat is trimmed.

The headrest guide according to this invention is adapted to be installed in aligned holes drilled in a seat back frame tube after the seat is trimmed. It comprises a unitary, elongated plastic guide body having a flange on one end for engaging the exterior surface of the seat fabric covering.

An intermediate shank has a shoulder that cooperates with a locking tang on the other end of the guide body to lock the guide to the tube. A finger extends from one side of the shank to embrace the tube intermediate the apertures to prevent rotation of the guide in the apertures. A headrest post is received in a central bore and is detented in selected positions by a spring which enters the bore to engage notches on the post.

The guide is simply inserted through a hole in the seat back upholstery and through the tube apertures where it is nonremovably locked into position. A slot in the shank parallel to the bore is provided for insertion of a long, thin object, such as a screwdriver, to move the spring out of the bore to enable removal of the post from the bore to dismount the headrest from the seat back.

Where round posts are utilized, the headrest will usually comprise two such posts and two guides will be provided in the seat back. The guide is preferably plastic and provides a continuous plastic bore engaging the headrest support post.

BRIEF DESCRIPTION OF THE DRAWINGS

The features and advantages of this invention will become more readily apparent upon reference to the following detailed description of the attached drawings, in which.

DETAILED DESCRIPTION OF THE INVENTION

Figure 1:
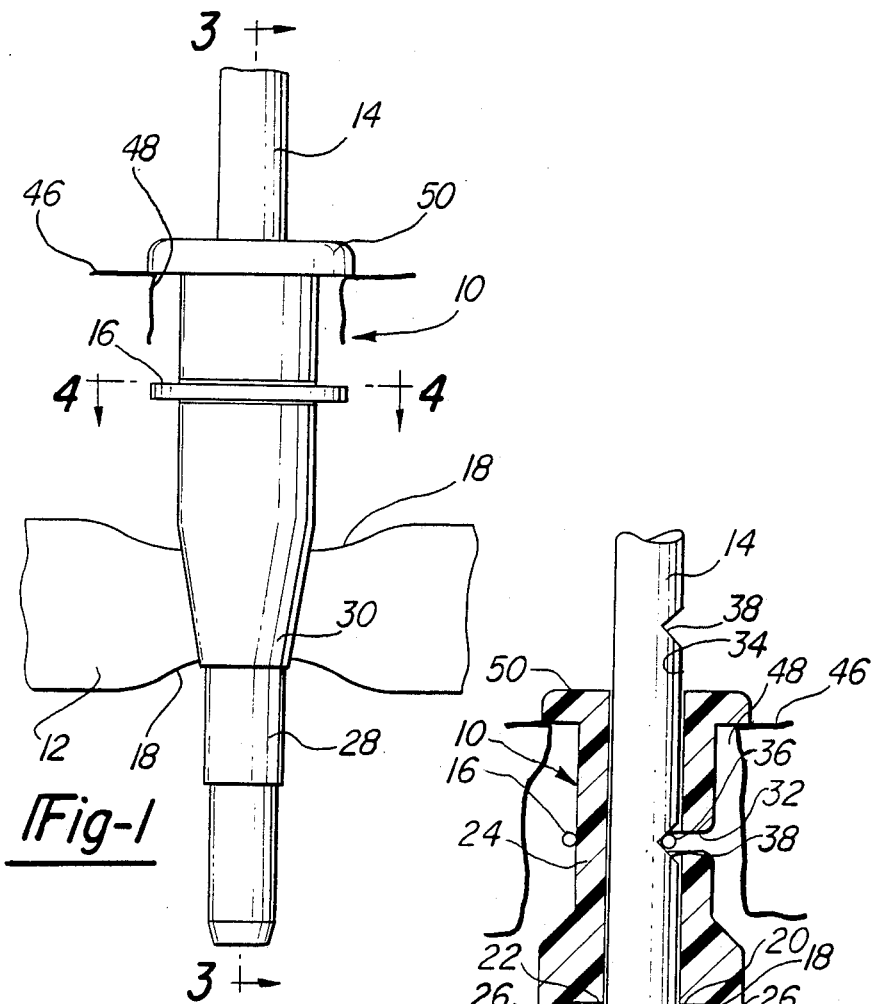
FIG. 1 is a front view of a headrest post guide according to this invention, shown installed on a seat back frame tube, with a headrest support post inserted.
Figure 2:
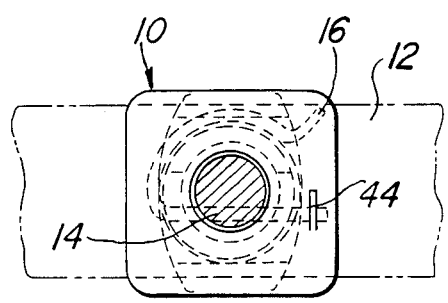
FIG. 2 is a top view of the guide of FIG. 1.

Referring now to FIGS. 1 and 2, a headrest support post guide 10, according to this invention is illustrated as installed on a seat back frame tube 12, with a metal support post 14 of a conventional headrest (not shown) inserted into the guide 10. Guide 10 is preferably made of molded plastic. A wire spring clip 16 embraces guide 10 to retain the post 14 in a preselected position, as will be later described.

Figure 3:
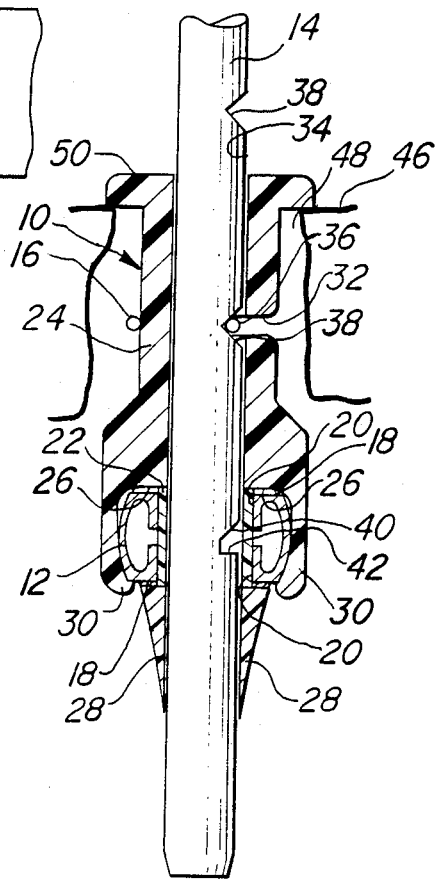
FIG. 3 is a sectional view, taken along lines 3—3 of FIG. 1.

Referring additionally to FIG. 3, tube 12 is flattened at 18 and a pair of aligned apertures 20 are drilled to receive the shank portion 22 of the body 24 of guide 10. Body 24 further includes a peripheral shoulder 26 which engages the upper surface of flattened tube section 18 adjacent upper aperture 20. The lower end of body 24 terminates in a pair of diametrically-opposed locking tangs 28 which engage the lower surface of flattened tube section 18 adjacent lower aperture 20 to lock the guide 10 to the frame tube 12.

Figure 4:
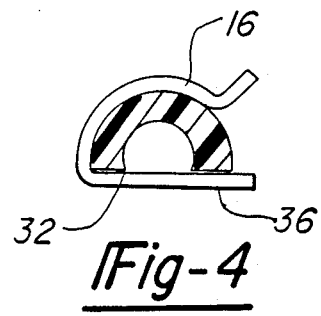
FIG. 4 is a sectional view, taken along lines 4—4 of FIG. 1.

Guide body 24 extends outwardly from shoulder 26 to form a pair of fingers 30 which grip the sides of tube 12 to prevent rotation of guide 10 within apertures 20. Referring additionally to FIG. 4, the upper portion of guide body 24 includes a transverse groove 32 that intersects the through bore 34 of body 24. Spring clip 16 terminates in a straight detent arm 36 that normally occupies groove 32 to engage spaced V-shaped detent notches 38 formed in one side of headrest support post 14.

Since notches 38 are formed in only one side of post 14, and groove 32 and spring detent arm 36 are located on only one side of guide body 24, it is imperative that these sides are always aligned. This is assured by fingers 30 which prevent rotation of guide 10 relative to the tube apertures 20. Because of the shape of notches 38, upward or downward force on post 14 will cam spring arm 36 out of notches 38. This enables adjustment of the headrest to a selected number of vertical positions relative to the seat back corresponding to the number of detent notches 38 provided in post 14.

Post 14 has a bottom locking notch 40 which engages spring arm 36 when the headrest is moved to its uppermost position. Since notch 40 has a bottom shoulder 42 perpendicular to the direction of movement of post 14, upward force on post 14 cannot cam arm 36 out of the notch. This prevents inadvertent removal of the headrest from the seat back. To enable purposeful removal of the headrest, guide body 24 is provided with an axial slot 44 which intersects groove 32, as shown in FIG. 2. The slot is configured to enable insertion of a flat rod or thin screwdriver to engage spring arm 36 and pry it out of slot 32 to permit removal of post 14 from bore 34.

The guide 10 is installed as follows. The seat back is trimmed with upholstery 46 which contains a hole 48 in alignment with apertures 20 in frame tube 12. Guide 10 is simply inserted through hole 48 and apertures 20 which squeezes tangs 28 together as they are moved through the tube 12. Upon exiting bottom aperture 20 tangs 28 spring outwardly, shoulder 26 abuts the upper flattened tube surface 18, and fingers 30 snap over tube 12 to lock guide 10 to tube 12. In this position, the upper trim flange 50 provided on guide body 24 engages the outer surface of upholstery 46 to conceal hole 48.

The headrest support post 14 may now be inserted into through bore 34, with the upper surfaces of notches 40 and 38 camming spring arm 36 out of bore 34 into groove 32 until a desired position is reached, with spring arm 36 engaging a notch 38. The headrest may easily be repositioned by moving post 14 up or down with sufficient force to overcome the detenting action of spring arm 36 and a notch. Since the guide is plastic, the normally metal rod slides easily in bore 34. Removal of post 14 from bore 34 is prevented by the barrier engagement of spring arm 36 with notch shoulder 42. Removal is accomplished by inserting a long thin flat rod, such as a screwdriver, through axial slot 44 into engagement with spring arm 36, which can then be pried out of locking notch 40. This frees rod 14 which can now be removed.

Figure 5:
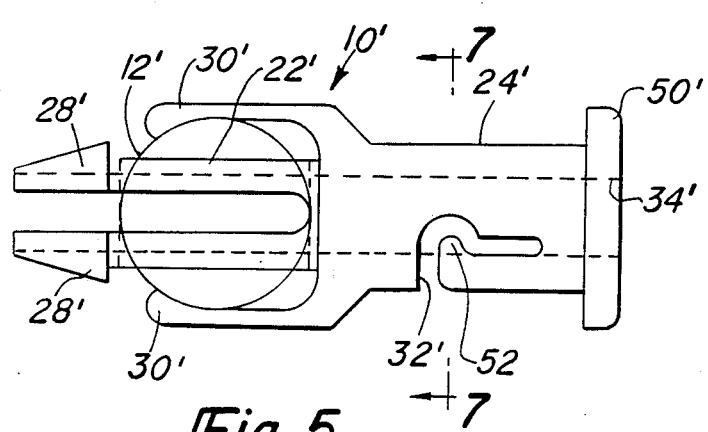
FIG. 5 is side view of a another embodiment of the invention of FIG. 1.
Figure 6:
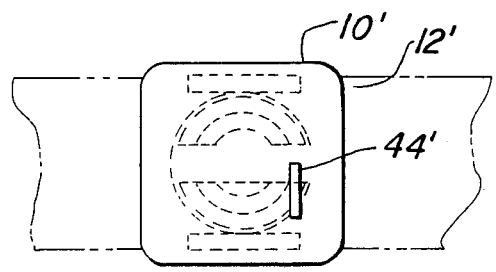
FIG. 6 is a top view of the embodiment of FIG. 5.
Figure 7:
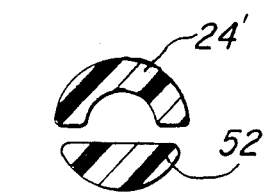
FIG. 7 is a sectional view taken along lines 7—7 of FIG. 5.

Another embodiment of this invention is shown in FIGS. 5 and 6, in which elements similar to those described above are designated with similar primed numbers. The only important difference between guide 10' and guide 10 is the means for positioning the headrest support post. Guide 10' includes an integral spring arm 52 which projects into through bore 34' to engage the notches on the headrest support post. Spring arm 52 is functionally equivalent to spring arm 36 of guide 10. An axial slot 44' is similarly provided to enable insertion of a tool to pry spring arm 52 out of groove 32' for removal of the headrest.

In both embodiments of this invention a headrest support post guide is simply installed after the seat back is trimmed and provides a continuous plastic bearing surface engaging the post. While only two embodiments have been shown and described, many modifications could be made within the scope and spirit of the invention. The spring arm could be differently positioned along the length of the guide body, such as at the end of the locking tangs. A single anti-rotation finger could be used and a different number of locking tangs could be provided. These and further modifications are contemplated within the scope of the following claims.

What is claimed is:

1. A guide for mounting a headrest post on an automotive seat structural tube having aligned apertures on opposite surfaces, wherein the post has a plurality of spaced detent notches, the guide comprising:
    an elongated plastic guide body having a seat upholstery-engaging flange on one end,
    an intermediate shank including a shoulder engaging the tube adjacent one aperture,
    a locking tang on the other end for engaging one side of the tube adjacent the other aperture to cooperate with the shoulder and lock the guide to the tube upon insertion of the guide through the apertures,
    a finger extending from one side of the shank to embrace the tube intermediate the apertures to prevent rotation of the guide relative to the tube,
    a central through bore for receiving the post,
    a groove in the shank intersecting the bore, and
    a spring normally occupying the groove for engagement with the post detent notches to position the post within the guide and being movable out of the bore to enable repositioning of the post, whereby the guide may be inserted through the apertures after the automotive seat is trimmed.

2. The guide of claim 1, wherein the spring is engageable with one of the post notches to prevent removal of the post from the guide and the guide body includes an axial slot parallel to the bore and intersecting the groove so as to enable insertion of a tool into the slot to move the spring out of said notch to enable removal of the post from the guide.

3. The guide of claim 1, further including a second finger extending from the other side of the shank so as to grip the tube between the fingers.

4. A unitary plastic guide for mounting a headrest post on a structural tube of a trimmed automobile seat back by inserting the guide through a hole in the seat back upholstery and through aligned apertures in the tube, wherein the post has a plurality of detent notches, the guide comprising:
    an elongated guide body having an upholstery-engaging flange on one end,
    an intermediate shank extending through the aligned apertures, including a shoulder engaging the tube adjacent one aperture,
    a locking tang on the other end for engaging the tube adjacent the other aperture to lock the guide to the tube upon insertion of the guide through the apertures,
    a finger extending from the shank to embrace the tube intermediate the apertures to prevent rotation of the guide within the apertures relative to the tube,
    a central through bore for receiving the headrest post, and
    a spring arm carried by the guide for engagement with the post detent notches to position the post within the guide and being movable out of the notches to enable repositioning of the post.

5. The guide means of claim 4, wherein the spring arm comprises an integral portion of the guide body.

6. The guide means of claim 4, wherein the spring arm is engageable with one of the post notches to prevent removal of the post and the guide body includes an axial slot parallel to the bore to enable insertion of a tool into the slot to move the spring arm out of said notch to enable removal of the post from the guide.

7. The guide of claim 6, further including a second finger extending from the other side of the shank so as to grip the tube between the fingers.

8. The guide of claim 7, further including a second locking tang diametrically opposite the first locking tang for engaging the tube adjacent the other aperture.

* * * * *